United States Patent [19]

Hamar

[11] 3,902,810
[45] Sept. 2, 1975

[54] SYSTEM AND METHOD FOR ALIGNING APPARATUS UTILIZING A LASER

[75] Inventor: Martin R. Hamar, Wilton, Conn.

[73] Assignee: Hamar Laser Instruments, Inc., Wilton, Conn.

[22] Filed: Oct. 11, 1973

[21] Appl. No.: 405,523

[52] U.S. Cl. ............... 356/138; 250/239; 356/153; 356/172
[51] Int. Cl.² .......................................... G01B 11/26
[58] Field of Search ........ 356/172, 138, 153; 350/6; 250/239

[56] References Cited
UNITED STATES PATENTS

| | | | |
|---|---|---|---|
| 2,837,959 | 6/1958 | Saunderson et al. | 356/80 |
| 3,535,525 | 10/1970 | Minkowitz | 250/203 |
| 3,551,057 | 12/1970 | Hamilton et al. | 356/172 |
| 3,588,249 | 6/1971 | Studebaker | 356/172 |
| 3,632,215 | 1/1972 | Holtz | 356/172 |
| 3,708,232 | 1/1973 | Walsh | 356/172 |
| 3,742,581 | 7/1973 | Roodvoeis et al. | 356/172 |

Primary Examiner—Ronald L. Wibert
Assistant Examiner—Richard A. Rosenberger
Attorney, Agent, or Firm—Anthony J. Casella

[57] ABSTRACT

Lenses with flat parallel surfaces are pivotally mounted on vertical and horizontal axes and cooperatively associated with a laser capable of producing a beam of monochromatic coherent light to displace the beam in horizontal and vertical planes so that the laser can be conveniently utilized with fixtures having targets thereon and a read-out meter which indicates the position of the beam relative to the center of the target to align the components of a turbogenerator or other apparatus which has a centerline which sags in a vertical direction.

9 Claims, 14 Drawing Figures

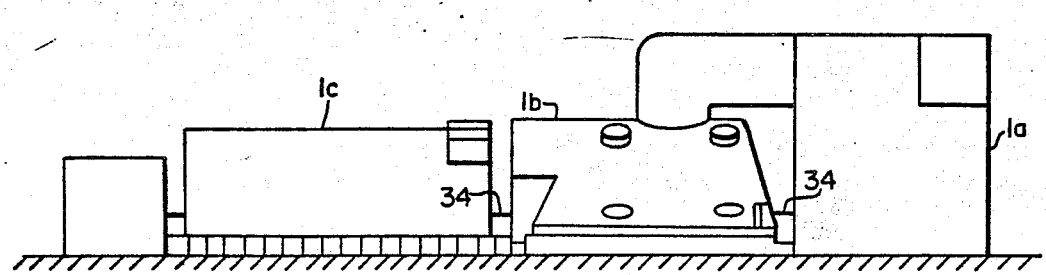
FIG. 1
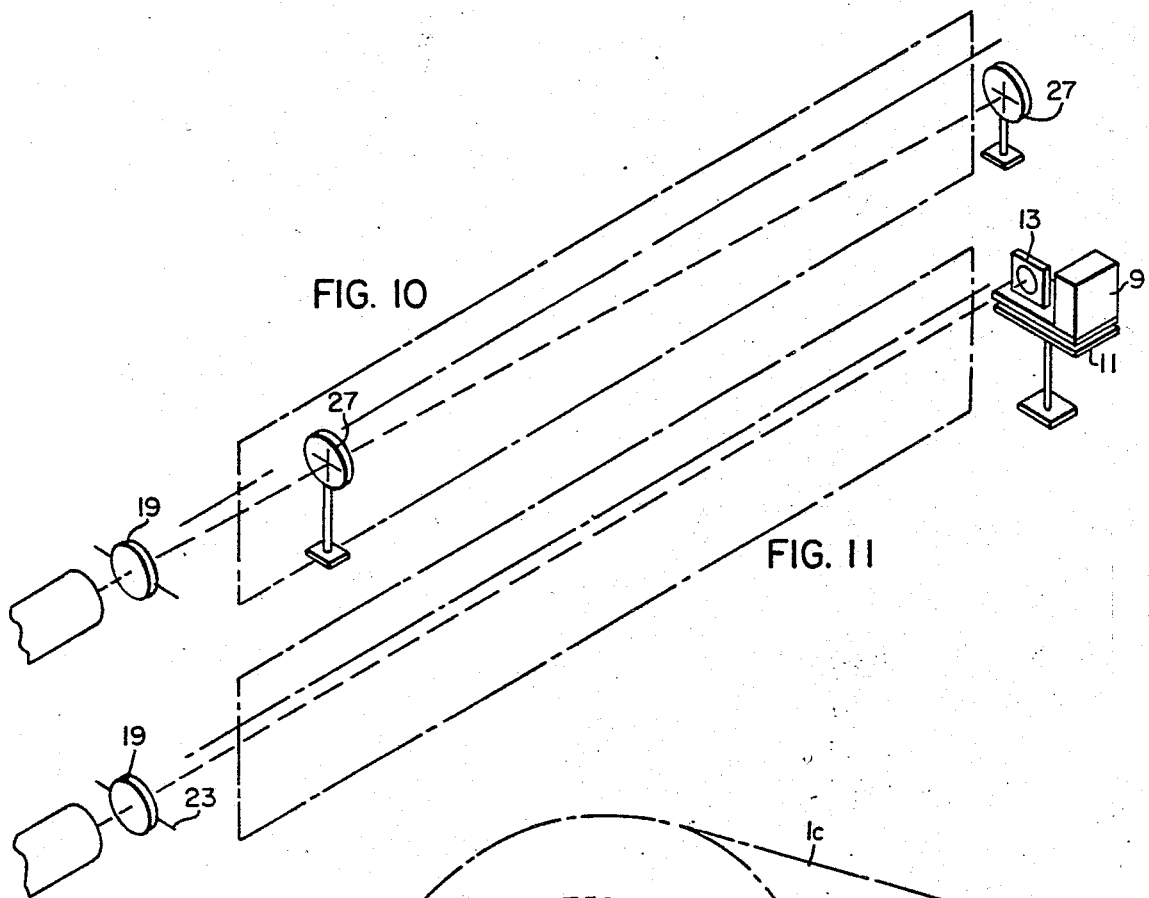
FIG. 10
FIG. 11
FIG. 12

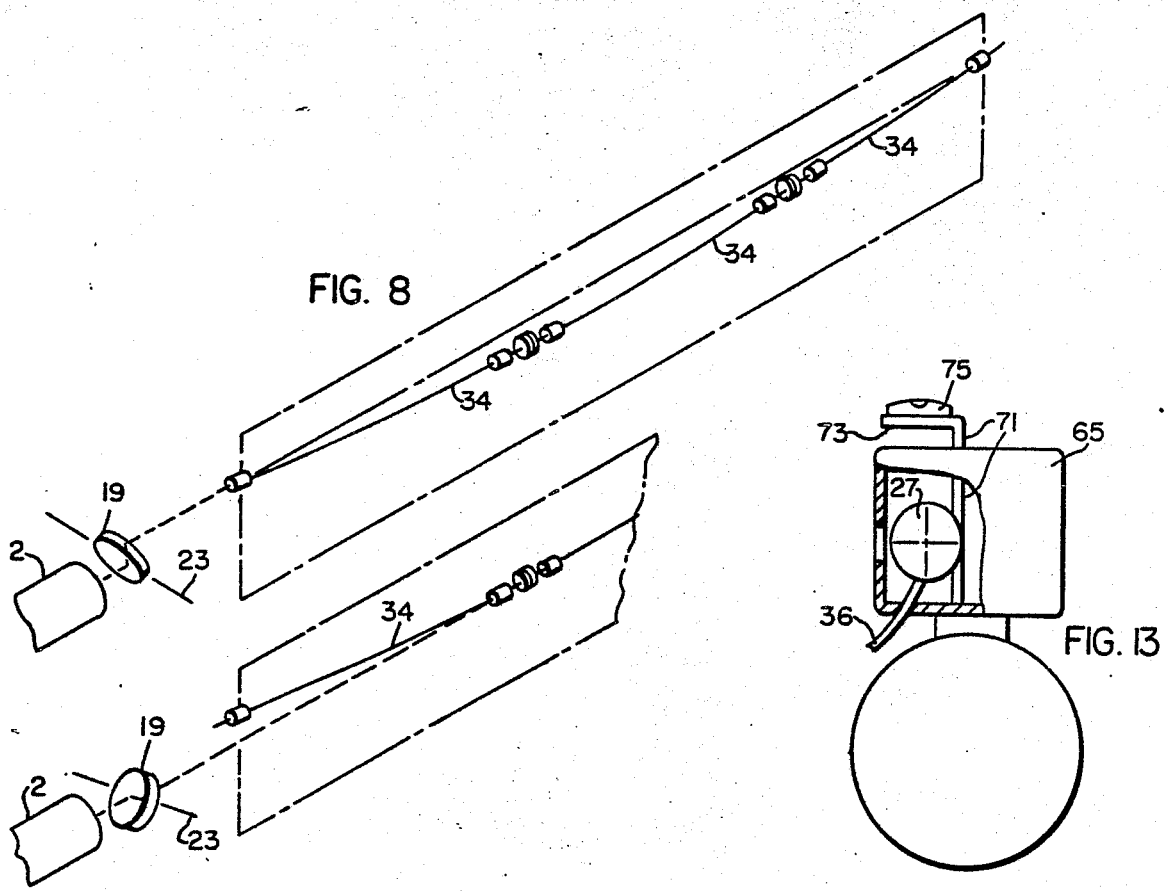
FIG. 8
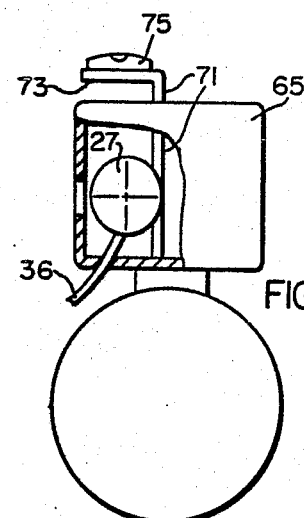
FIG. 13
FIG. 9a
FIG. 9b
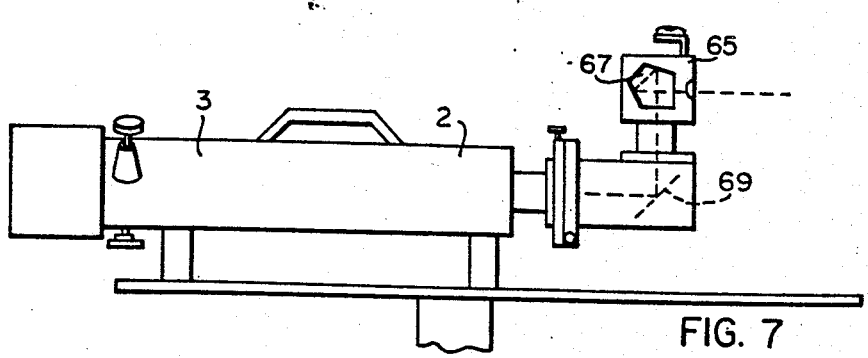
FIG. 7

SYSTEM AND METHOD FOR ALIGNING APPARATUS UTILIZING A LASER

BACKGROUND OF THE INVENTION

This invention relates to a system and method for aligning a turbogenerator or other apparatus having a centerline which sags in a vertical direction and more particularly to utilizing a laser in such a system and method.

Because of the distance between bearings and the mass of the rotors of a turbogenerator unit it is common practice to align the components so that the axes are generally disposed on an arcuate line which sags in the center or generally takes the shape of a catenary. This results from the fact that each rotor sags between its bearings and it is desirable to provide close alignment between the end surfaces of the coupling joining the components in order to reduce the amount of wear on the couplings and to produce a smooth running unit. (See FIG. 9 for an illustration of these principles).

Prior methods for aligning such equipment included tightly stretching a wire between two points on the desired centerline and measuring the distance from the axis of the components to the wire and then positioning the components with respect to the wire. Of course, the wire itself sags forming a true catenary, and the amount of the sag must be taken into account in determining the relative position of the various components with respect to the wire. However, the main problem with utilizing a tight wire, as this method is often called, is measuring the distance between the wire and the components requires a high degree of skill and a particular technique or touch, so that generally two individuals do not obtain the same measurements and repeated measurements by the same individual are not necessarily duplicates. Thus, the accuracy of the alignment depended to a great degree on the skill of the individual performing these measurements.

SUMMARY OF THE INVENTION

An alignment system for apparatus having a saging centerline, when made in accordance with this invention, comprising a laser for producing a beam of coherent light, a device for leveling the beam so that it is generally normal to a radial line extending from the center of the earth and passing through a point adjacent the laser, a device for moving the beam parallel to itself in a horizontal plane, a device for moving the beam parallel to itself in a vertical plane, and a device for detecting the beam and determining its position relative to a known reference point, and a method for aligning the aparatus utilizing this system.

BRIEF DESCRIPTION OF THE DRAWINGS

The objects and advantages of this invention will become more apparent from reading the following detailed description in connection with the accompanying drawings, in which:

FIG. 1 is an elevational view of a typical turbogenerator having a plurality of components which are disposed on a centerline which sags in a vertical direction;

FIG. 7 is an elevational view of a laser with a device for projecting the beam in a horizontal plane;

FIG. 8 is a schematic diagram of a lens utilized to offset the laser beam parallel to itself;

FIG. 9a and 9b are schematic views of shafts of components of a turbogenerator aligned on a straight centerline and aligned on a centerline which sags in a vertical direction;

FIG. 10 is a schematic view of a laser beam being utilized with two targets to establish a vertical plane containing a desired centerline;

FIG. 11 is a schematic view of a laser beam being leveled in the plane containing the desired centerline;

FIG. 12 is a perspective view of a laser being utilized with a bore centered target to align one portion of one component of a turbogenerator; and FIG. 13 is an elevational view of the device for projecting the laser beam in a horizontal plane.

DESCRIPTION OF THE PREFERRED EMBODIMENT

Figure 2:
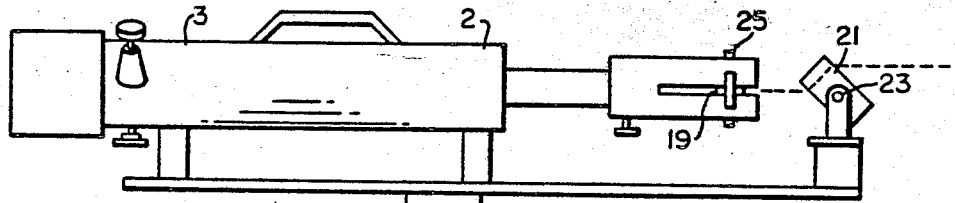
FIG. 2 is an elevational view of a laser on an adjustable stand with vertical and horizontal beam displacement lenses.

Referring now to the drawings in detail, FIG. 1 shows a turbogenerator unit 1 having a plurality of components disposed on a centerline which sags in a vertical direction, and FIG. 2 shows a laser 2 capable of projecting a beam of coherent monochromatic light in the range of 1 to 3 milliwatts output which is utilized to align the components of the turbogenerator. The laser 2 is mounted in a housing 3 fastened to an adjustable base 5, which has three leveling screws 7, which act as feet forming a tripod type base to provide stability irrespective of the surface on which the laser is placed. The base 5 is adapted to be vertically adjustable to allow general positioning of the laser 2 at any desired elevation. The laser 2 is equipped with electronic leveling means, which is adapted to sweep the beam with respect to the housing 3. Thus, the beam can be adjusted to be projected in a horizontal plane without moving the base or housing.

Figure 3:
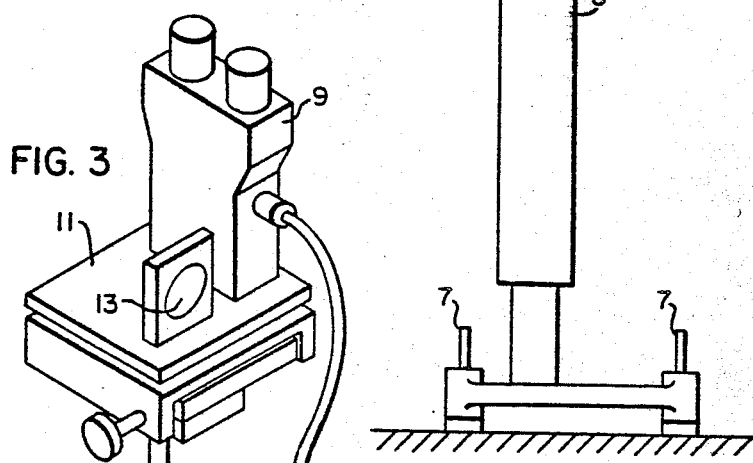
FIG. 3 is a perspective view of a device for determining that the laser beam is level.

FIG. 3 shows an electronic level 9, such as the one built by Rank Taylor Hopson Company of Leicester, England and partially described in U.S. Pat. Nos. 3,081,552 and 3,160,237, mounted perpendicular to a flat plate 11 along with a mirror 13, which is also mounted perpendicular to the plate. The plate 11 is leveled with the electronic level 9 and the laser beam is directed at the mirror 13 and generally perpendicular thereto, causing a series of dots to appear on the mirror. The beam is then adjusted until the dots converge into one dot, and when this one dot begins to diminish in intensity, the beam is exactly perpendicular to the mirror 13, level and normal to a line passing through the center of the earth and a point adjacent the laser.

As shown in FIGS. 2 and 8, means for offsetting or translating the beam parallel to itself or parallel to the beam being projected by the laser, in horizontal and vertical planes or in the X and Y directions comprise lenses 19 and 21, respectively, which are made of glass and have a pair of generally parallel flat surfaces. The lens 21 is pivotally mounted to rotate about a horizontal axis 23 to translate the beam parallel to itself in a vertical plane and the lens 19 is pivotally mounted to rotate about a vertical axis 25 to translate the beam parallel to itself in a horizontal plane.

Figure 4:
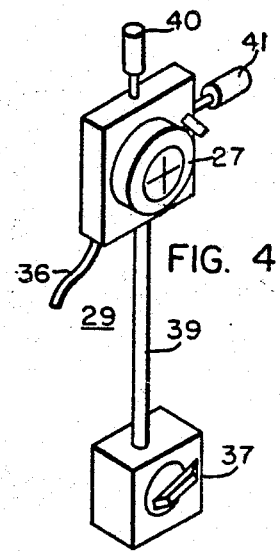
FIG. 4 is a perspective view of a fixture for determining the location of the beam relative to the center of a target, which does not have a known elevation from the base.
Figure 5:
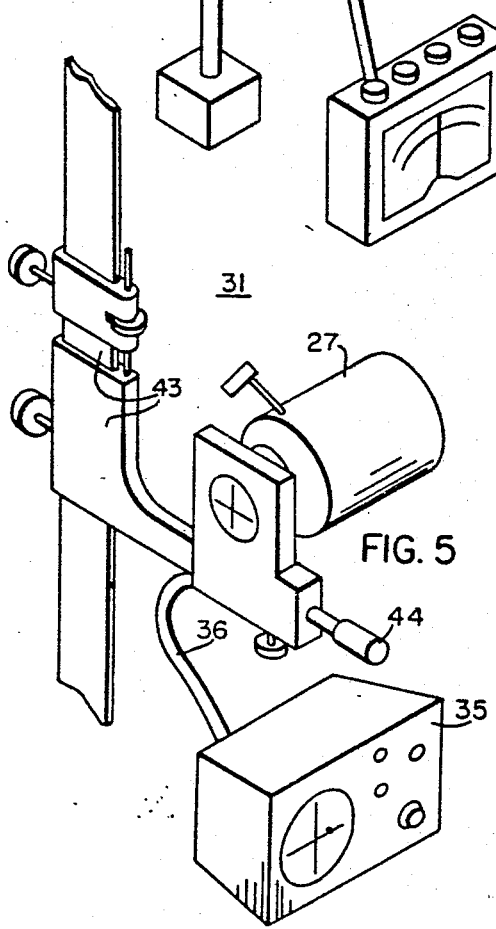
FIG. 5 is a perspective view of a fixture for indicating the elevation of the beam relative to a known elevation and having a read-out meter associated therewith.
Figure 6:
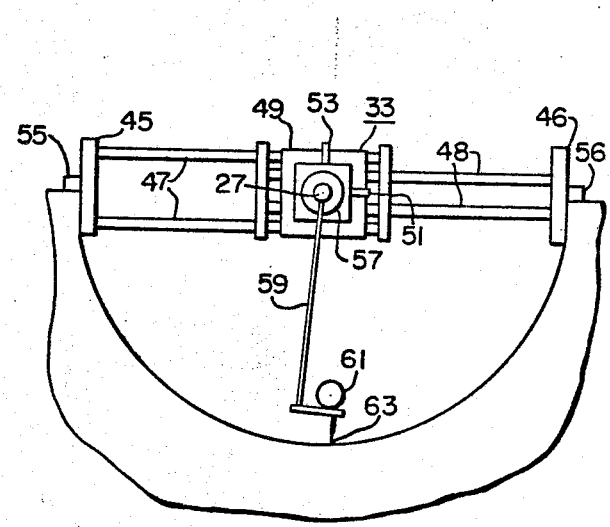
FIG. 6 is an elevational view of a fixture for indicating the location of the beam relative to a center of a bore.

As shown in FIGS. 4, 5 and 6, electronic targets 27 comprising a cluster of four photocells as described in detail in U.S. Pat. N0. 3,535,525 are pivotally connected to various fixtures 29, 31 and 33, which provide for precise X and Y calibrated movement or adjustment of the targets. The targets 27 are pivotally mounted so that they can be flipped out of the way to allow the beam to pass through the fixtures 29, 31 and 33, whereby a plurality of fixtures can be utilized to reduce the time required to align apparatus such as a turbogenerator which comprises a plurality of elements or components, as for example, a high pressure turbine portion 1a, one or more low pressure turbine portions 1b and a generator portion 1c joined together on a common shaft 34 which sags in a vertical direction similar to a catenary.

The output of the photocells in the target 27 is fed to a read-out meter 35, i.e., a Model 400.2.0 Read-out Meter as produced by Hamar Lasar Instruments, Inc., Walton, Conn., via an insulate multi-conductor wire 36 to provide an optical indication of the location of the beam relative to the center of the photocells forming the target 27. As shown in FIGS. 4, 5 and 6, the targets 27 are supported by various fixtures 29, 31 and 33 each fixture is adapted for a particular purpose.

The fixture 29, as shown in FIG. 4, has a magnetic base 37, a rod 39 extending upwardly from the base 37 and a target 27 mounted on the rod 39. The fixture 29 also has micrometer screws 40 and 41 to provide precise X and Y or horizontal and vertical movement of the target 27 relative to the base 37, providing means for detecting the beam and determining its position with respect to a known reference point.

The fixture 31, as shown in FIG. 5, is mounted on a base, not shown, and has a vernier heighth gauge 43 extending upwardly from the base to provide a relatively large amount of calibrated movement in the vertical or Y direction, a micrometer screw adjustment 44 to provide horizontal or X direction movement and a flip out target 27.

Fixture 33, as shown in FIG. 6, is adapted to be mounted in a bearing generally split along a horizontal plane extending through the center thereof, and has opposed base plates 45 and 46, extension rods 47 and 48, which are positioned to base plates 45 and 46, respectively, and a carriage 49 which is slidably connected to the extension rods 47 and 48. The carriage 49 incorporates X and Y adjustment micrometer screws 51 and 53.

The extension rods 47 and 48 are extendible in opposite directions from the carriage 49 so they can be expanded to engage the edges of the split bearing. Magnetic supports 55 and 56 are disposed on the outer surfaces of the base plates 45 and 46 respectively, so as to engage the horizontal surfaces extending from the upper edges of the split bearing. A target 27 is disposed on the carriage 49 and a precision bearing is disposed around the target 27. The bearing has a ring 57 fastened thereto and a rod 59 is slidably connected to the ring 57. A dial indicator 61 is disposed on the end of the rod 59 and a contact point 63 of the dial indicator 61 is disposed on a line extending radially from the center of the bearing and target to provide accurate alignment of the target 27 with respect to the center of a bore.

FIG. 7 shows the laser 2 equipped with a device 65 for projecting the beam radially in a horizontal plane and comprises a rotatably mounted penta prism 67 which has the characteristic of projecting a beam 90° to the angle at which the beam enters the prism. Cooperative associated with the prism is a mirror 69 set at an angle to project a level beam at an angle of 90° thereto. The device 65 for projecting a beam in a horizontal plane, as shown in FIG. 13, also has a target 27 rotatably disposed therein to assist in checking the beam to insure it is being projected in a horizontal plane. Utilizing the device 65 with the laser and the fixtures 29 and 31 provides an aligning system which can be utilized in the early stages of the installation of the turbogenerator to level the components by setting the seating plates for the various components at any desired elevation relative to the beam by merely rotating the device 65, after the beam has been leveled utilizing the electronic leveling means 9 as described hereinbefore, and the target 27 rotatably disposed within the device 65.

The target 27 in the device 65, as shown in FIG. 13, is mounted on a vertical shaft 71 so that the center of the target 27 rotates in a horizontal plane and into the path of the laser beam. A lever 73 is disposed on the upper end of the shaft 71 and has a spiral level 75 attached thereto, to insure that the shaft 71 is vertical or plumb when leveling the laser beam.

With the shaft 71 vertical, the target 27 is flipped in front of the beam and the beam is aligned with the center of the target utilizing the read out meter 35, which is connected to the target 27 by the cord 36, and the adjusting means disposed within the device 65. The mirror 13 on the leveling means 9 is adjusted until it is vertical and the target 27 in the device 65 is flipped out of the path of the laser beam, allowing the beam to strike the mirror, which is rotated so that the reflected beam strikes the target 27 in the device 65 along a vertical line extending through the center of the target 27. The laser beam is then adjusted, utilizing the internal adjusting means, to strike the center of the target 27. The target is flipped back into the path of the beam and the above-described procedure is repeated until the laser beam strikes the center of the target when it is in either position, at which time the beam is disposed in a horizontal or level plane.

To align a turbogenerator or other apparatus having a plurality of components disposed on a centerline which sags in the vertical direction or is catenary shaped the laser is set up, as shown in FIG. 10, so that the beam passed through two points on the desired centerline as determined by positioning two targets so that their centers are coincident with the two points on the desired centerline. The lenses 19 and 21 may be utilized to offset the beam in a horizontal or vertical plane to assist in rapidly aligning the laser with the two targets. As illustrated in FIG. 11, the beam is then leveled utilizing the electronic leveling means 9 so that it is horizontal or disposed perpendicular to a line extending radially from the center of the earth and passing through a point adjacent the laser 2. Alternatively, the position of the two targets can be disposed so that they are at the same elevation and their centers are coincident with the centerline. When such is the case, the laser beam is level when it is adjusted to pass through the center of the two targets.

Once the laser beam is level and can be directed to pass through two points of the desired centerline by adjusting the lens 21 which translate the beam parallel to itself in a vertical plane. The elevation is determined by utilizing the fixture 31 incorporating a height gauge 43 in order to determine the elevation of the beam relative to a known reference. As may be seen best in FIG. 12, the bore centering fixture 33 is then disposed in the bore of one of the components, normally in one of the bearings surfaces, and centered utilizing the dial indicator 61 and X and Y adjustment micrometer screws 51 and 53. When the center of the target 27 is coaxially aligned with the axis of the bore of the bearing surface the dial indicator will so indicate as the dial indicator is rotated about the bearing surface. The fixture 31 is then set via the height gauge so that the center of the target is at the desired elevation of the portion of the component relative to the centerline and the beam is moved parallel to itself in a vertical plane by rotating the lens 21 until a meter on the beam read-out means 35 indicates that the beam is projected at the center of the cluster of photocells forming the target 27. With the beam at the desired elevation of the axis of the components at the location of the bore centering fixutre 33, the beam is directed to the target 27 mounted in the bore centering fixture and a read-out meter 35 connected thereto indicates the X and Y deviation of the beam from the center of the target. These X and Y deviations indicate the magnitude and the direction that the one portion of the one component must be moved to locate the beam at the center of the target and align the axis of one portion of the component with the desired centerline of the apparatus. The component is moved in X and Y directions until the read-out meter 35 indicates that the beam is coincident with the center of the target, then the fixture 33 is checked to insure that it is still concentrically disposed within the component. The beam may be rechecked to insure that it is located at the proper elevation and to assure that it is still aligned with two points on the centerline. This procedure is repeated with the bore centering fixture 33 at another position in the one component until another portion of the component is at its desired location with respect to the centerline. Since each target 27 can be flipped out of the line on which the beam is being projected, utilizing a plurality of alignment fixtures will speed up aligning the components and also make checking and rechecking the alignment of the components and the alignment of the laser beam rapid and accurate.

Offsetting the beam in a vertical direction while aligning apparatus, which has a centerline which sags in a vertical direction, has the advantage of allowing the bore centering fixtures 33 to be disposed at the axis of the bore and to remain centered and be returned to the center at all times making aligning and checking the fixture relative to the bore faster, more accurate and simpler and it eliminates the need to calculate and account for the offset of the axis of the component with respect to the beam. Utilizing a read-out meter to indicate the position of the beam relative to the center of the target, is more rapid and accurate than determining the location of the beam with respect to an optical target or utilizing an optical instrument such as a telescope or transit to align the components.

Another method of aligning apparatus having a plurality of components and a centerline which sags in a vertical direction comprises the steps of:

aligning the beam from a laser with two points on the desired centerline of the apparatus utilizing fixtures having targets the centers of which are disposed a known distance from a reference point to establish a vertical plane containing the centerline as shown in FIG. 10; leveling the beam so that it is perpendicular to a radial line passing through the center of the earth at a point adjacent the laser as shown in FIG. 11; positioning a bore centering fixture 33 in one position within one component of the apparatus, normally a bearing surface, so that the center of the target is coincident with the axis of the component as shown in FIG. 12; determining the X and Y readings on the micrometer screws when the axis of the one portion of the component is coincident with the center of the target, moving the center of the target so that the center is coincident with the beam; determining the X and Y readings on the micrometer screws; and determining the X and Y deviation of the beam from the axis of the component at the one portion; adding a correction for the vertical deviation between the elevation of the beam and the desired elevation of the portion of a component relative to the centerline; moving the component in X and Y directions to align the axis of the component with the desired centerline; moving the target utilizing the X and Y micrometer screws so that the center of the target of the bore centering fixture is coincident with the beam; determining the X, Y deviation of the target with respect to the axis of the component at the one position; if at the desired vertical displacement from the desired centerline, relocating the center of the target coincident with the axis of the component to check that the axis of the component is coincident with the desired centerline; and repeating any of the above-mentioned steps as may be necessary to align the one portion of the component with the centerline so as to hold a predetermined tolerance. Once one portion of a component is aligned, it is necessary to repeat the above-mentioned steps utilizing the bore centering fixture 33 at a second location in the one component. Each component is then aligned in a similar manner until all components are disposed at their proper position on the desired centerline. This last-mentioned method of aligning a turbogenerator unit has the advantage of positioning the laser beam at one location and allowing it to remain in that position throughout the aligning operation permitting repeated checks to determine that it is not moved relative to one or more reference points.

The system and methods hereinbefore described advantageously provide both rapid and accurate alignment of apparatus having a plurality of components disposed on a centerline which sags in a vertical direction.

I claim:

1. An alignment system for apparatus, said system comprising stationary means for producing a beam of coherent light, means for leveling said beam so that it is generally normal to a radial line extending from the center of the earth and passing a point adjacent said beam producing means, means disposed adjacent said stationary means for producing a beam of coherent light for moving said beam parallel to itself in a horizontal plane, means disposed adjacent said stationary means for producing a beam of coherent light for moving said beam parallel to itself in a vertical plane, and means for detecting said beam and determining its position with respect to a known reference point, said detecting means including a rotatably mounted target that, in one position, is adapted to detect the relative position of the beam with respect to a known reference point, and which is rotatable to a second position to allow the beam to pass through the detecting means.

2. A system as set forth in claim 1 and further comprising means for projecting the beam in a generally horizontal plane so that it generally radiates from a point so as to form an infinite series of horizontal lines as said horizontal projecting means is rotated.

3. A system as set forth in claim 2, wherein the horizontal projecting means is rotatable without rotating a source of the beam.

4. An alignment system for apparatus, said system comprising stationary means for producing a beam of coherent light, means for leveling said beam so that it is generally normal to a radial line extending from the center of the earth and passing a point adjacent said beam producing means, means disposed adjacent said stationary means for producing a beam of coherent light for moving said beam parallel to itself in a horizontal plane, means disposed adjacent said stationary means for producing a beam of coherent light for moving said beam parallel to itself in a vertical plane, and means for detecting the location of the beam relative to a horizontal plane, and said detecting means includes a rotatably mounted target that, in one position, is capable of detecting the relative elevation of said beam and, in a second position, is capable of allowing said beam to pass therethrough.

5. An alignment system for apparatus, said system comprising stationary means for producing a beam of coherent light, means for leveling said beam so that it is generally normal to a radial line extending from the center of the earth and passing a point adjacent said beam producing means, means disposed adjacent said stationary means for producing a beam of coherent light for moving said beam parallel to itself in a horizontal plane, means disposed adjacent said stationary means for producing a beam of coherent light for moving said beam parallel to itself in a vertical plane, and means for detecting the location of said beam relative to the center of a bore wherein the detecting means includes a rotatably mounted target that, in one position, is adapted to detect the relative position of the beam with respect to the center of the bore and, in a second position, allows the beam to pass therethrough.

6. A method for aligning apparatus having a plurality of elements disposed on a centerline which sags in a vertical direction utilizing a laser capable of projecting a beam of coherent light and target means for detecting the beam and determining its position with respect to a known reference point, said method comprising the steps of locating and fixing the laser so that it projects a generally horizontal beam of coherent light through two points on said centerline; locating a target so that the center of the detecting means is coincident with the axis of one element, displacing the beam vertically a distance corresponding to the vertical displacement of the portion of the element with respect to the two points on the centerline through which the beam originally passed; positioning said one element so that its axis generally aligns with the target and the detecting means indicates the beam is coincident with the axis of the one element, placing a target in a second position in the one element so that the detecting means is aligned with the axis of the one element; displacing the beam vertically a distance equal to the desired displacement of the second portion of the element relative to the line betweeen the two points on the centerline; positioning the element so that the detecting means indicates that the axis of the element is coincident with the beam; and proceeding in a like manner with each successive element until all of the elements are aligned with the centerline which sags in a vertical direction.

7. A method for aligning apparatus having a plurality of elements on a centerline which sags in a vertical direction utilizing a laser capable of projecting a beam of coherent light and target means for detecting the beam and determining the position of the beam with respect to known reference points, said method comprising the steps of leveling the beam so that it is generally horizontal; locating and fixing the laser so that its beam passes through two points on said centerline; locating one element axially and generally aligning it with said centerline, positioning a target relative to a first position on the one element so that the beam detecting means is aligned with the axis of the element; displacing the beam vertically a distance corresponding to the vertical distance between an imaginary line through the points where the beam intersects the centerline and a desired elevation of the axis of the element at the location of the target; positioning the one element so that the beam detecting means indicates that the beam is coincident with the axis of the element at the location of the target; positioning the target relative to a second position on the one element so that the beam detecting means is aligned with the axis of the element, displacing the beam vertically a distance corresponding to the vertical distance between an imaginary line through the points where the beam intersects the centerline and the desired elevation of the axis of the element at the second location of the target; positioning the one element so that the beam detecting means indicates that the beam is coincident with the axis of the element at the second location of the target in the element; repeating the above-mentioned steps on each successive element to be aligned until all the elements are aligned on the centerline which sags in a vertical direction.

8. A method for aligning apparatus having a plurality of elements disposed on a centerline which sags in a vertical direction utilizing a laser capable of projecting a beam of coherent light and target means for detecting the light beam and determining its position with respect to a known reference point and having X and Y direction adjusting means, said method comprising the steps of locating two targets so that the center of the detecting portions of the targets are on the centerline of the apparatus; locating and fixing the laser so that the light beam generally aligns with the center of the two targets, displacing the light beam parallel to itself in vertical and horizontal planes until it is in a vertical plane passing through the center of the detection portion of the two targets aligned with the centerline; leveling said beam so that it is perpendicular to a line passing through the center of the earth and passing through a point adjacent the laser; locating the center of a detecting portion of the target means at one location coincident with the axis of one element; displacing the detecting portion with X and Y adjusting means until the detecting portion of the target is centered with respect to the light beam; determining the displacement of the axis of the element with respect to the centerline; adding the desired sag correction to the Y displacement; moving the element so that its axis aligns with the desired position of the centerline; centering the detecting portion of the target means with the light beam; checking the X and Y location of the detecting means with respect to the axis of the element; relocating the element, if necessary, to align the axis with the centerline of the apparatus; locating the center of the detecting portion of a target means at a second location coincident with the axis of one element; displacing the detecting portion with the X and Y adjusting means until the detecting portion of the target means is centered with respect to the light beam, determining the displacement of the axis of the element with respect to the centerline; adding the desired sag correction to the Y displacement; moving the element so that its axis aligns with the desired position on the centerline; centering the detecting portion of the target means with respect to the light beam; checking the X, Y location of the detecting means with respect to the axis of the element; relocating the element, if necessary to align the axis with the centerline of the apparatus; and repeating the above-mentioned steps for each element until all the elements of the apparatus are aligned with the centerline.

9. A method for aligning apparatus having a plurality of elements disposed on a centerline which sags in a vertical direction utilizing a laser capable of projecting a beam of coherent light and target means for detecting the light beam and determining its position with respect to a known reference point, said method comprising the steps of; locating two target means so that their centers are coincident with said centerline and are disposed at the same elevation; locating and fixing the laser and direction its beam so that it passes through the center of said target means having their centers coincident with said centerline; locating a target so that the center of the detecting means is coincident with the axis of one element, displacing the beam vertically a distance corresponding to the vertical displacement of the portion of the element with respect to the two points on the centerline through which the beam originally passed; positioning said one element so that its axis generally aligns with the target and the detecting means indicates the beam is coincident with the axis of the one element, placing a target in a second position in the one element so that the detecting means is aligned with the axis of the one element; displacing the beam vertically a distance equal to the desired displacement of the second portion of the element relative to the line between the two points on the centerline; positioning the element so that the detecting means indicates that the axis of the element is coincident with the beam; and proceeding in a like manner with each successive element until all of the elements are aligned with the centerline which sags in a vertical direction.

* * * * *